(12) United States Patent
Sasaki

(10) Patent No.: US 10,091,367 B2
(45) Date of Patent: Oct. 2, 2018

(54) INFORMATION PROCESSING DEVICE, IMAGE FORMING APPARATUS AND INFORMATION PROCESSING METHOD

(71) Applicant: KYOCERA Document Solutions Inc., Osaka (JP)

(72) Inventor: Hideyuki Sasaki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 273 days.

(21) Appl. No.: 15/100,312

(22) PCT Filed: Sep. 19, 2014

(86) PCT No.: PCT/JP2014/074771
§ 371 (c)(1),
(2) Date: May 29, 2016

(87) PCT Pub. No.: WO2015/079784
PCT Pub. Date: Jun. 4, 2015

(65) Prior Publication Data
US 2016/0301817 A1    Oct. 13, 2016

(30) Foreign Application Priority Data

Nov. 29, 2013  (JP) ................................ 2013-247960

(51) Int. Cl.
*G06T 13/00*     (2011.01)
*H04N 1/00*     (2006.01)
(Continued)

(52) U.S. Cl.
CPC ....... *H04N 1/00458* (2013.01); *G06F 3/0485* (2013.01); *G06F 3/0488* (2013.01);
(Continued)

(58) Field of Classification Search
USPC ................................. 345/173, 475; 352/87
See application file for complete search history.

(56) References Cited

U.S. PATENT DOCUMENTS 8,860,730 B2 * 10/2014 Ooba .................... G06F 3/0488
345/157
2010/0188352 A1 * 7/2010 Ikeda .................. G06F 3/04883
345/173
(Continued)

FOREIGN PATENT DOCUMENTS

JP  H07-064706 A   3/1995
JP  H11-338456 A   12/1999
(Continued)

*Primary Examiner* — Kimbinh T Nguyen
(74) *Attorney, Agent, or Firm* — Hawaii Patent Services; Nathaniel K. Fedde; Kenton N. Fedde

(57) ABSTRACT

To provide an information processing device that can perform scroll operations without preparing model-specific tables. An image forming apparatus (1) causes a moving interval calculating part (110) to calculate moving interval values (250) of indication coordinates (320) of an object based on a ratio of an elapsed time (220) to the moving time (200) and a difference between end coordinates (240) and start coordinates (230). A moving interval value after setting wait part (120) adds the moving interval values (250) to the indication coordinates (320) of the object. An object drawing part (130) draws the object on the coordinates to which the moving interval values (250) are added and causes a display part to display the object.

3 Claims, 12 Drawing Sheets

(51) Int. Cl.
   *G06F 3/0488* (2013.01)
   *G06F 3/0485* (2013.01)
   *G06F 3/0484* (2013.01)

(52) U.S. Cl.
   CPC ...... *G06F 3/04845* (2013.01); *G06F 3/04883* (2013.01); *H04N 1/00411* (2013.01); *H04N 1/00464* (2013.01); *H04N 2201/0094* (2013.01)

(56) References Cited

U.S. PATENT DOCUMENTS

| | | | |
|---|---|---|---|
| 2011/0157047 A1* | 6/2011 | Nakagawa | G06F 3/0488 345/173 |
| 2013/0088449 A1* | 4/2013 | Kurumasa | G06F 3/04883 345/173 |
| 2013/0120289 A1* | 5/2013 | Seto | G06F 3/0488 345/173 |
| 2013/0234960 A1* | 9/2013 | Yamamoto | G06F 3/04883 345/173 |
| 2014/0145985 A1* | 5/2014 | Akai | G06F 1/3215 345/173 |
| 2014/0145991 A1* | 5/2014 | Tamai | G06F 3/0488 345/173 |

FOREIGN PATENT DOCUMENTS

| | | |
|---|---|---|
| JP | 2005-531824 A | 10/2005 |
| WO | WO2012008099 A1 | 1/2012 |

* cited by examiner

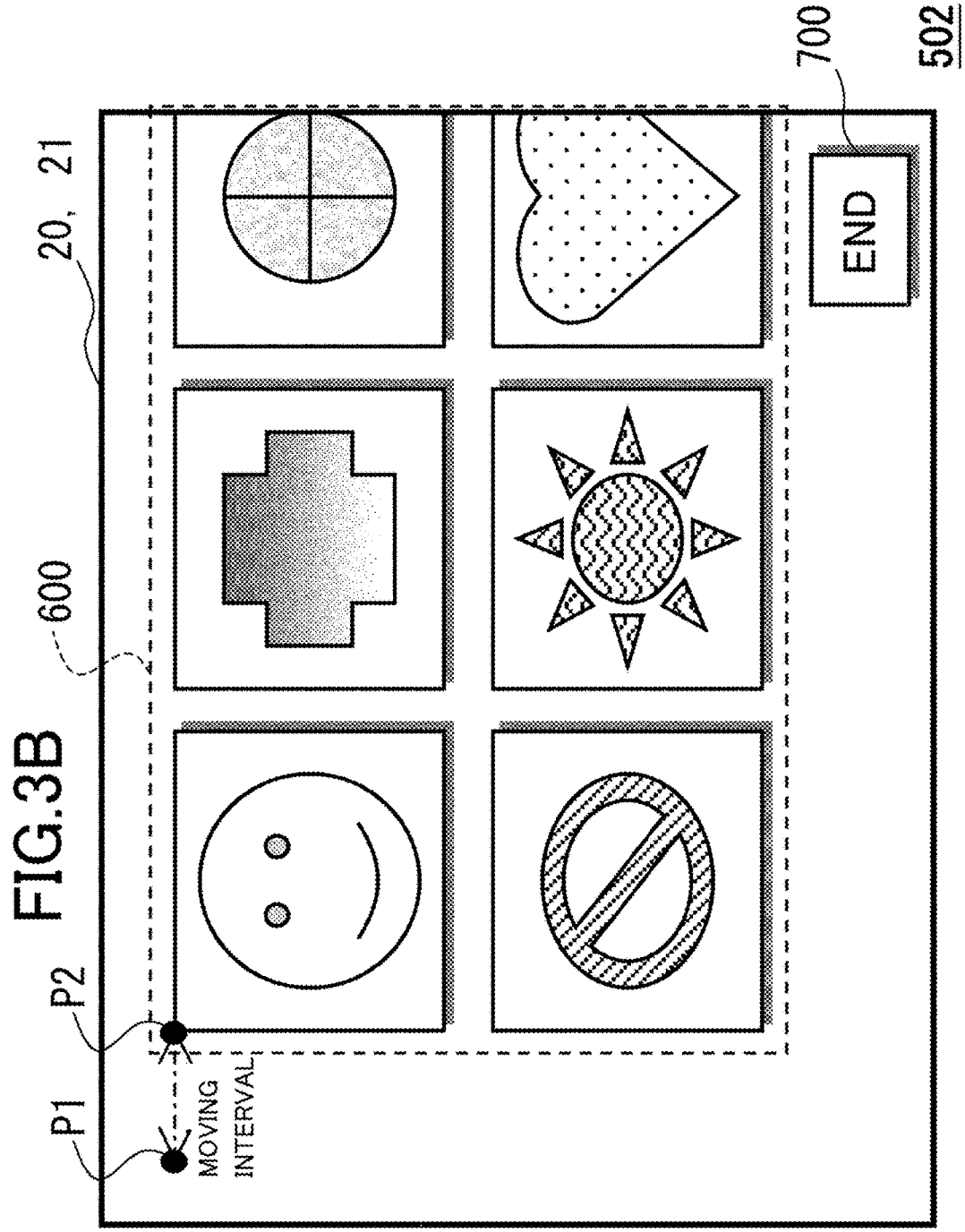

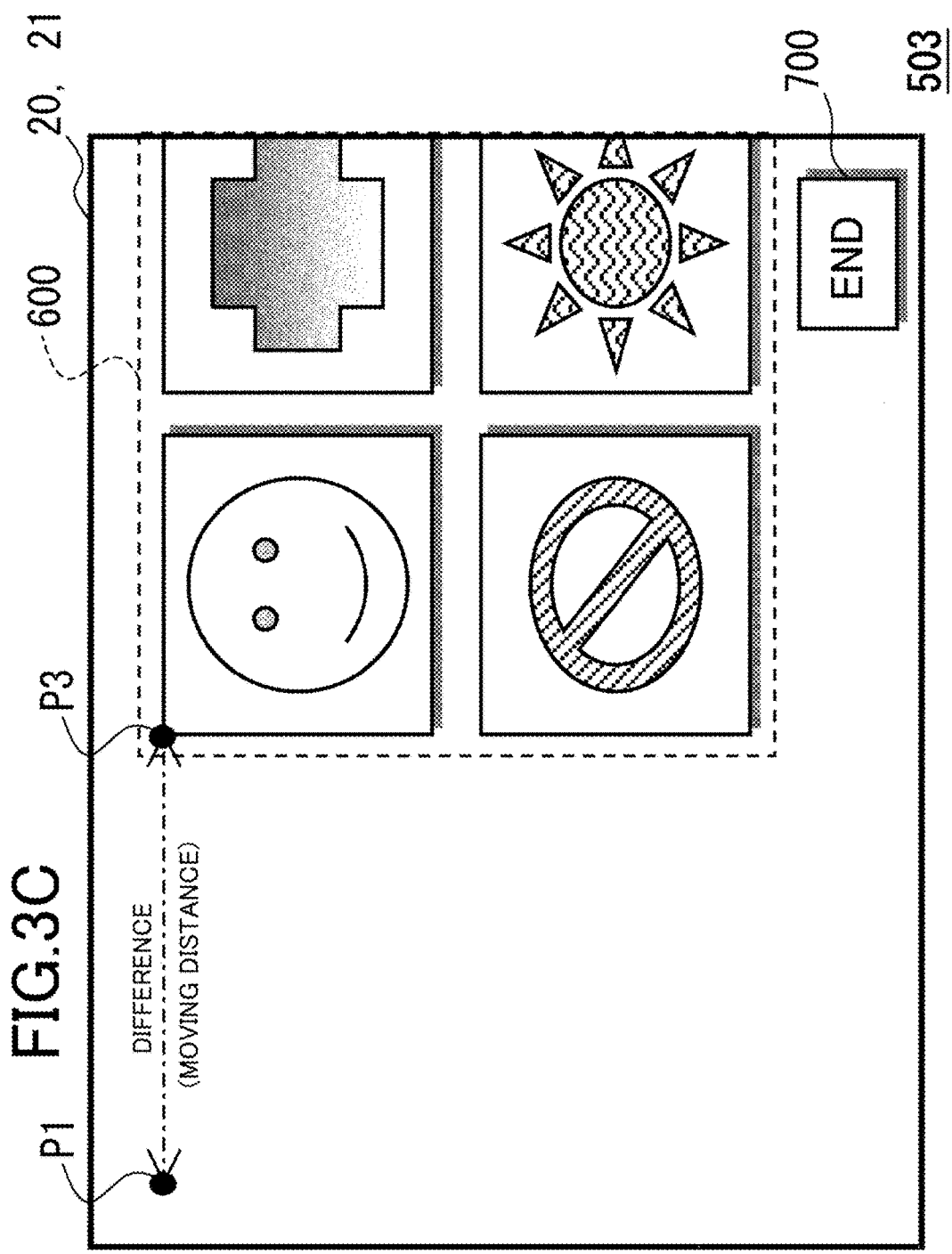

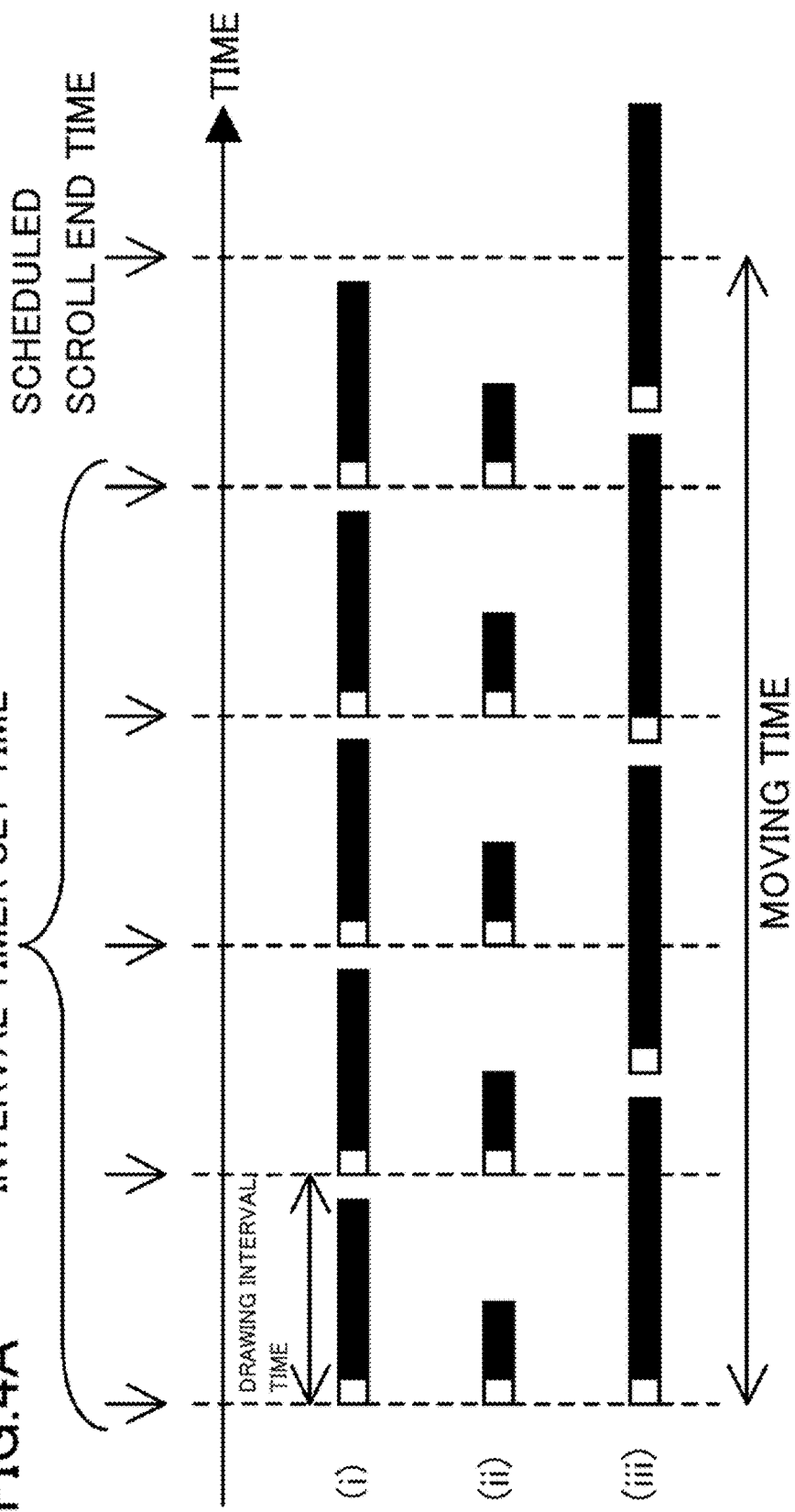

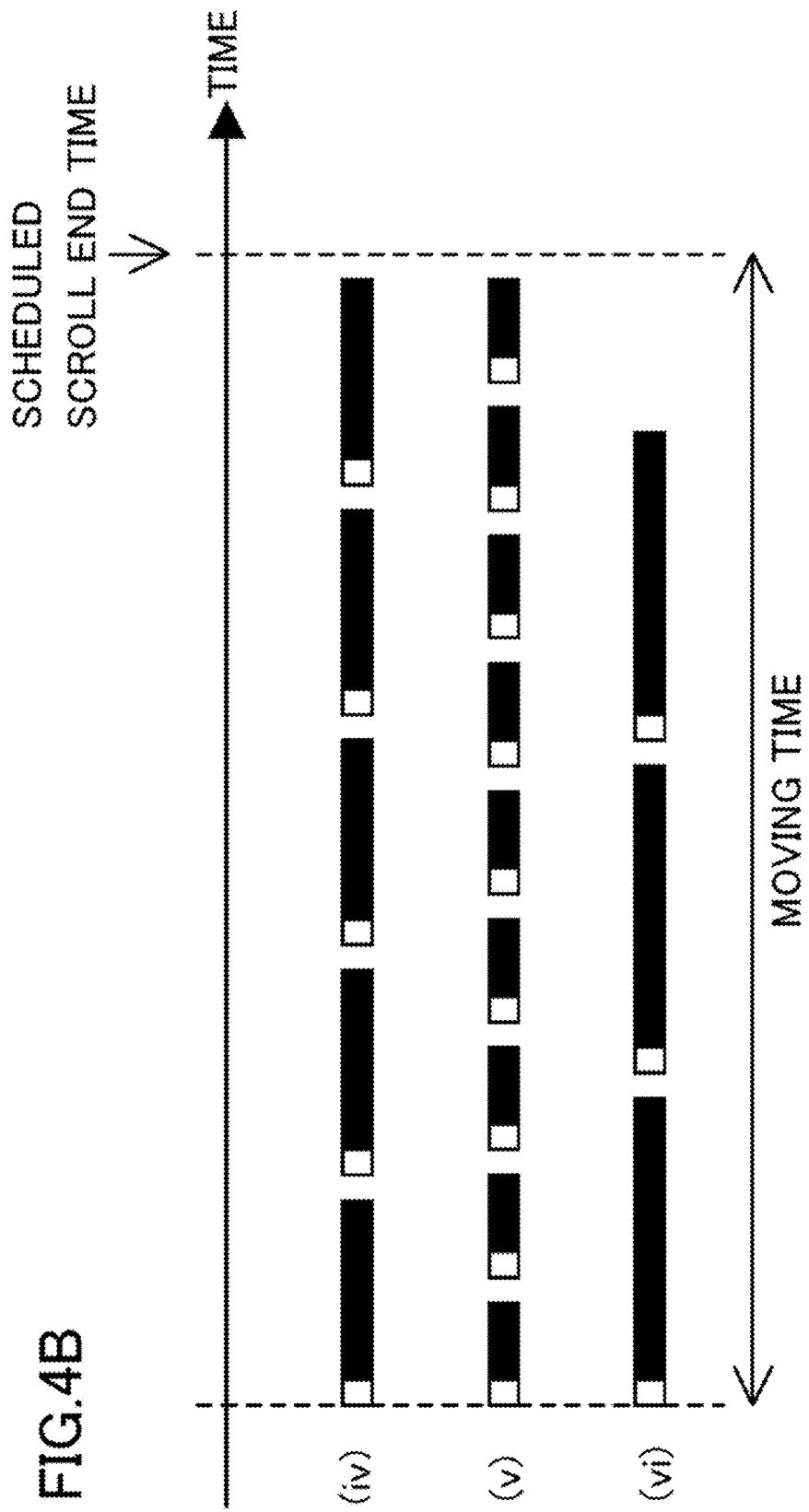

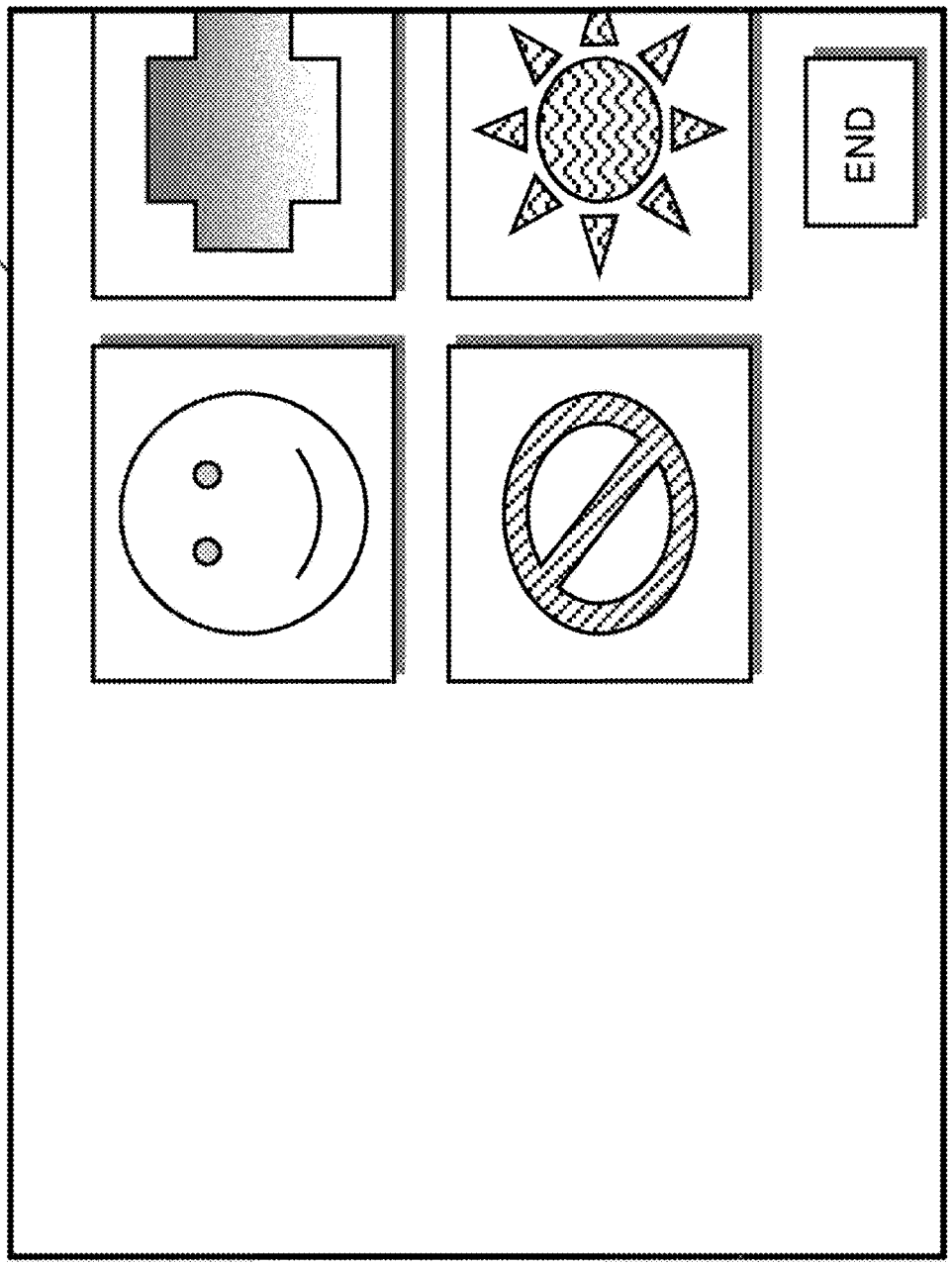

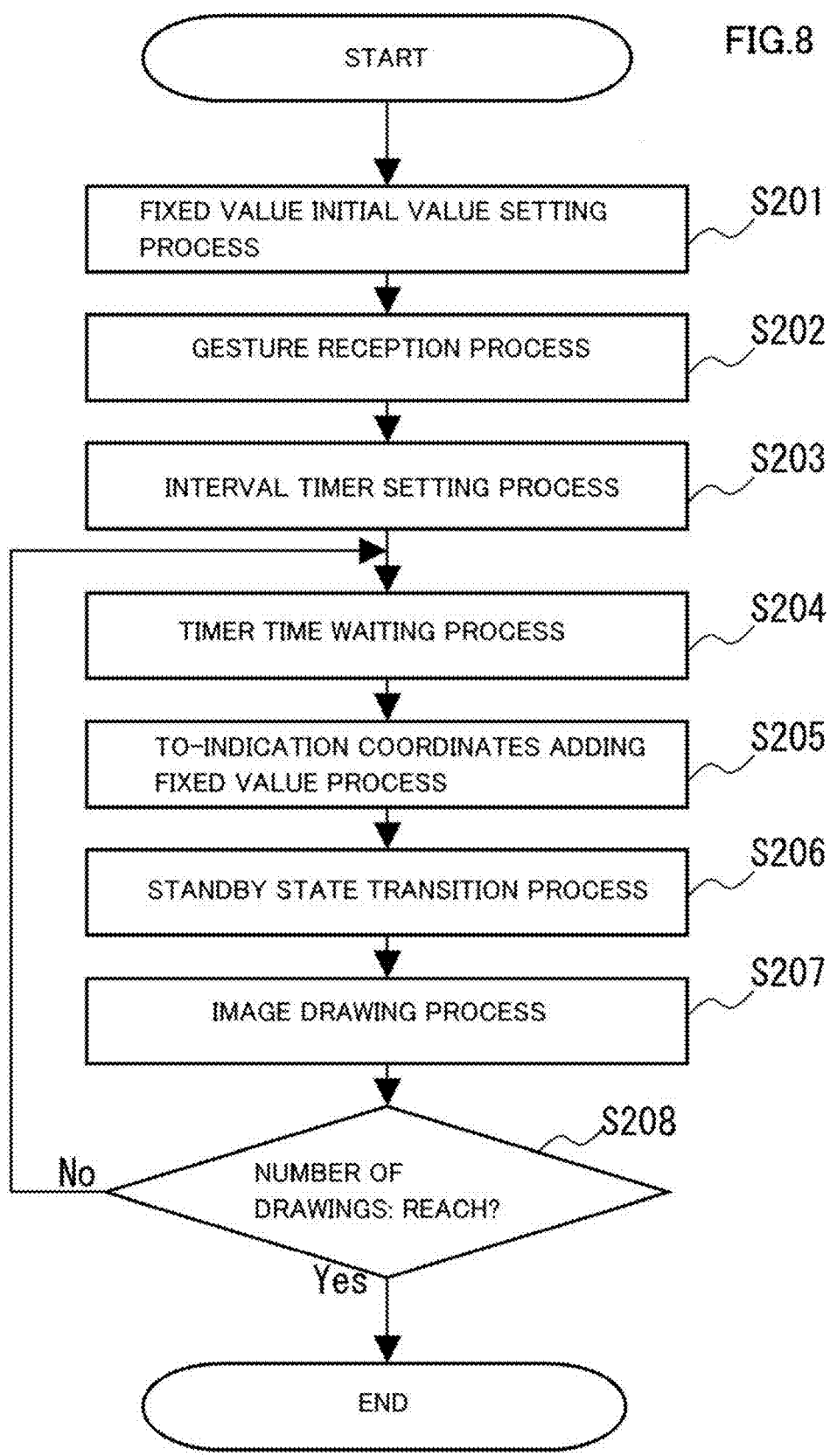

INFORMATION PROCESSING DEVICE, IMAGE FORMING APPARATUS AND INFORMATION PROCESSING METHOD

FIELD OF THE INVENTION

The present invention relates to an information processing device, an image forming apparatus and an information processing method, and in particular to an information processing device, an image forming apparatus, and an information processing method, each of which is configured to display an object on a display part such that the object is transited to move in a stepwise manner.

There has been provided an MFP (Multifunctional Peripheral) or the like which is capable of printing out documents and images. There are some examples of such an image forming apparatus which are capable of performing a "scroll" operation, by order of a user, which causes an on-screen image object to move vertically or horizontally. An example of such a conventional scroll operation is disclosed in Patent Literature 1.

In addition, according to FIG. 7, as seen from the relationship between an input part 20 and a display part 21, there is provided an image forming apparatus that is provided with a touch panel integrated with the display part. A user P is capable of instructing a scroll operation by, for example, depressing his/her finger onto the touch panel, followed by a sliding movement of the depressing finger. Such an instruction for the scroll operation or the like using the touch panel or the like is referred to a "gesture".

With reference to FIG. 8, a description is made in detail as to a conventional gesture-based scroll operation.

In the conventional gesture-based scroll operation, an application drawing part moves the coordinates of an image in a swiped direction in a stepwise manner to make a drawing. Repeating this process continuously will realize a screen scroll.

Hereinbelow, a specific description is made as to detailed processing steps with reference to a flowchart illustrated in FIG. 8.

(Step S201)

First of all, in a process of setting an initial value of a fixed value, a machine model code of the image forming apparatus is acquired which is stored in a storage part thereof. In addition, using this machine model code, a reference is made to a drawing interval time table in which is stored a paired combination of the machine model code and a drawing interval time, thereby the drawing interval time is set. Thus, it is possible for such the image forming apparatus to acquire its suitable drawing interval time.

The value of the suitable drawing interval time may vary from a hardware specification (performance) of the image forming apparatus. For example, as the drawing interval time, a value may be set which is in synchronization with a refresh rate of the display part 21. If the refresh rate is 60 Hz, an ideal drawing interval time 1/60 *1000=16.7 microseconds. Due to the fact that the actual display part 21 of the image forming apparatus is inferior in specification when compared with a PC (Personal Computer), drawing at an interval of 16.7 microseconds is a rare case.

(Step S202)

Then, in gesture detection process, when the user swipes the touch panel, that which the gesture operation has been performed and the swiped direction are detected.

In addition, the value of a time is acquired from the storage part which is set as a scrolling time and is divided by the drawing interval time to calculate the number of drawings.

Further, a distance is acquired from the storage part which is to be scrolled along the swiped direction and is divided by the number of drawings to calculate a moving interval value used for moving coordinates of an image in a stepwise manner.

(Step S203)

Then, in an interval timer setting process, an interval timer is set which is designed for calling a process of setting indication coordinates of the image in order that the drawings may be performed at setting drawing interval time.

(Step S204)

Then, in a timer time waiting process, a thread or the like which sets the indication coordinates of the image is held in a standby (sleep) state until the thread or the like is called by the interval timer.

(Step S205)

Then, in an indication coordinate fixed value addition process, the indication coordinates of the image are moved. If the setting drawing time interval elapses, the interval timer causes the thread or the like to be in an execution state which sets the indication coordinates. Thereafter, this thread changes the coordinates of each the image, thereby changing the position of each the image.

(Step S206)

In a standby state transition process, after the position of each the image is changed, the thread or the like which sets the indication coordinates of the image is brought into a standby state and the processing is returned to the browser or the like of the OS. This due to the process of setting the coordinates of the image and the process in which the browser or the like makes an actual drawing on the coordinates are executed in an asynchronous manner.

(Step S207)

In an image drawing process, the browser or the like causes the drawing whose coordinates are changed to appear on-screen actually. Thereby, the actual position of the appearance of the image is changed.

(Step S208)

After completion of the drawing of the image, it is determined whether or not the set number of drawings is reached.

If the result is "Yes", the scroll operation is terminated.

If the result is "No", the program returns to STEP S204 to continue the drawing by the interval timer.

PRIOR ART DOCUMENT

Patent Literature

Patent Literature 1: JP H11-338456 A

SUMMARY OF THE INVENTION

Problem to be Solved by the Invention

However, the conventional scroll operation that is performed by making a reference of the model code to the drawing interval time table is applied only to the existing device models. Thus, when a model is newly developed, a problem occurs wherein a fixed value drawing interval time table has to be produced again.

The present invention, which is made in light of the aforementioned circumstances, has an object to overcome the foregoing problem.

Means for Solving the Problem

An information processing device according to the present invention, which is configured to cause a display part to display indication coordinates of an object while the indication coordinates of the object are caused to move from start coordinates to end coordinates within a specified moving time in a stepwise manner, is including an elapsed time calculation part that is configured to calculate an elapsed time from a start of the movement of the object, a moving interval value calculation part that is configured to calculate moving interval values of the indication coordinates of the object based on a ratio of the elapsed time calculated by the elapsed time calculation part to the moving time and differences between the end coordinates and the start coordinates, a moving interval value setting part that is configured to add the moving interval values which are calculated by the moving interval value calculation part to the indication coordinates of the object, and an object drawing part that is configured to draw the object on coordinates which the moving interval value setting part adds the moving interval values to the indication coordinates of the object on the display part.

An information processing method according to the present invention, which is to be implemented by an information processing device that is configured to cause a display part to display indication coordinates of an object while the indication coordinates of the object are caused to transit for movement from start coordinates to end coordinates within a specified moving time in a stepwise manner, is including the steps of:

calculating an elapsed time from a start of the movement of the object;

calculating a moving interval value of the indication coordinates of the object based on a ratio of the elapsed time that is calculated to the moving time and differences between the end coordinates and the start coordinates;

adding the calculated moving interval value to the indication coordinates of the object; and drawing the object on coordinates as an addition of the moving interval value to the indication coordinates of the object on the display part.

Effects of the Invention

According to the present invention, even though a new model device has been developed, it is possible to provide the information processing device without having to prepare a drawing interval time table by calculating the moving interval value of the indication coordinates of the object based on a ratio of the elapsed time to the moving time and differences between the end coordinates and the start coordinates in movement of the object.

BRIEF DESCRIPTION OF THE DRAWINGS

FIG. 3B is a conceptual diagram of a moving interval value calculation process shown in FIG. 2.

FIG. 3C is a conceptual diagram of a moving interval value calculation process shown in FIG. 2.

FIG. 4A is a conceptual diagram of an object drawing process shown in FIG. 2.

FIG. 4B is a conceptual diagram of an object drawing process shown in FIG. 2.

FIG. 8 is a flowchart of a conventional scroll operation process.

MODES FOR CARRYING OUT THE INVENTION

Exemplary Embodiment

[Overall Configuration of Image Forming Apparatus 1]

Figure 5:
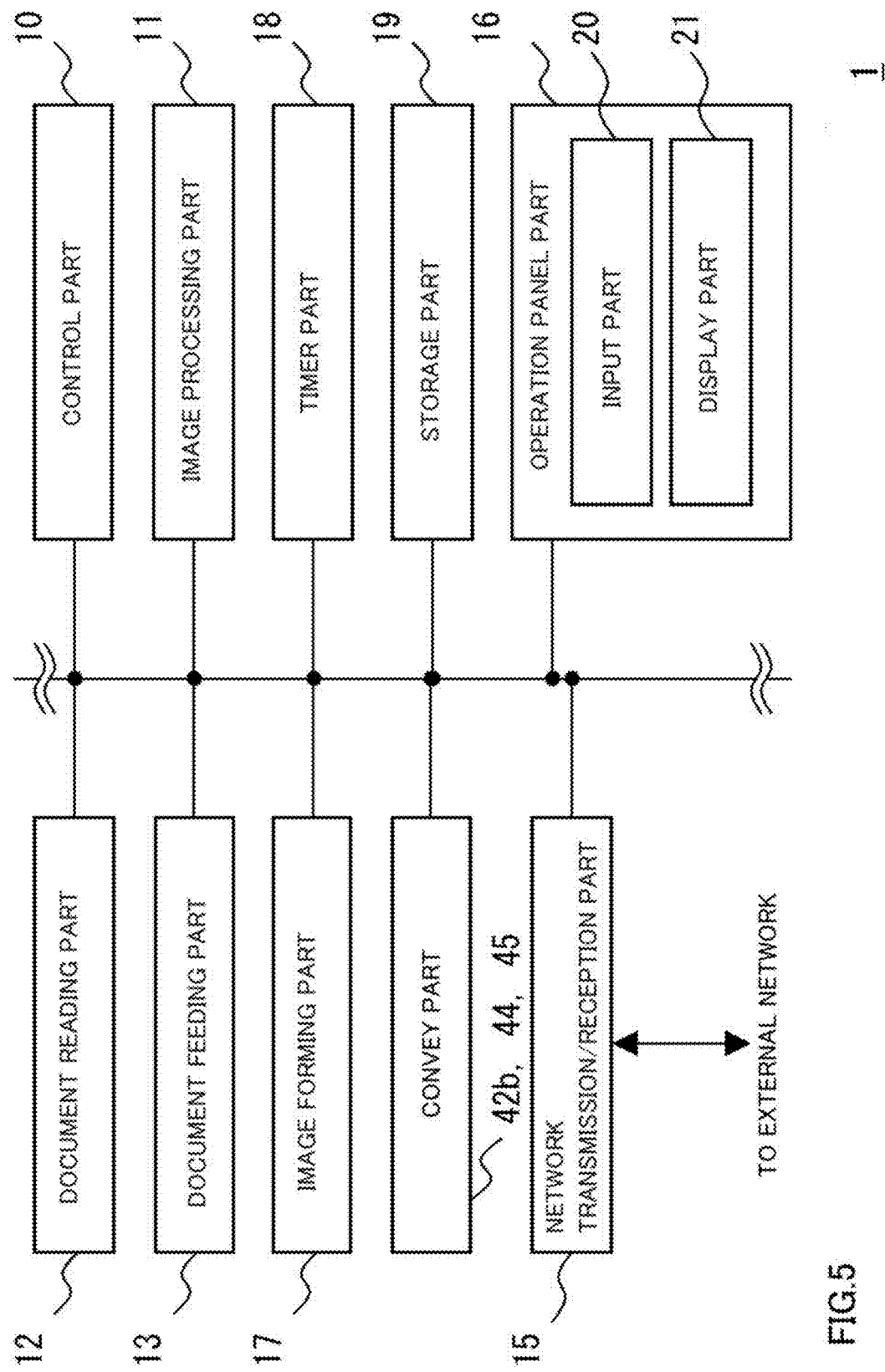
FIG. 5 is a block diagram that is illustrative of an overall configuration of the information processing device shown in FIG. 1.

First of all, with reference to FIG. 5, a description is made as to an overall configuration of an image forming apparatus 1 (in formation processing device).

In the image forming apparatus 1, a control part 10 is connected with an image processing part 11, a document reading part 12, a document feeding part 13, a conveying part (paper feed rollers 42b, paired conveying rollers 44, and paired ejecting rollers 45), a network transmission/reception part 15, an operation panel part 16, an image forming part 17, a timer part 18, a storage part 19, and other equipment.

Each the part is under an operation control of the control part 10.

The control part 10 is an information processing part of a GPP (General Purpose Processor), a CPU (Central Processing Unit), an MPU (Micro Processing Unit), a DSP (Digital Signal Processor), a GPU (Graphics Processing Unit), an ASIC (Application Specific Processor, Application specific integrated circuits), and other equipment for information processing.

The control part 10 is configured to readout a control program stored on a ROM or a HDD of the storage part 19 and develops the control program on a RAM for execution, thereby acting as each part of functional blocks that are detailed later. The control part 10 is also configured to execute control the device wholly in response to specific indication information that is inputted from an external terminal that is not shown or the operation panel part 16.

The image processing part 11 is a control arithmetic part of the DSP (Digital Signal Processor), the GPU (Graphic Processing Unit), and so on. The image processing part 11 is a unit for making various image processes on image data 310 which include, for example, enlargement/reduction, density adjustment, and image improvement.

The image processing part 11 is configured to cause the storage part 19 to store an image that the document reading part 12 reads, as print data. At this stage, the image forming part 11 is also capable of converting the print data in to a file unit of a format such as PDF or TIFF.

The document reading part 12 is configured to read a set document (scanning).

The document feeding part 13 is configured to feed the document read by the document reading part 12.

The image forming part 17 is configured to form an image on a recording paper from the data that are stored in the storage part 19, read by the document reading part 12, or acquired from the external terminal pursuant to a user's output instruction.

The conveying part is configured to convey a recording paper from a paper feeding cassette 42a (FIG. 6), cause the recording paper to be processed for image formation at the image forming part 17, and convey the recording paper to a stack tray 50.

It is to be noted that operations of the document reading part 12, the document feeding part 13, the conveying part, and the image forming part 17 are described later.

The network transmission/reception part 15 is a network connection part that includes, for example, a LAN board and wireless transmission/reception device for connection with an external network such as, for example, a LAN, a wireless LAN, a WAN, and cellar phone network.

The network transmission/reception part 15 is configured to transmit/receive data on a data communication line and transmit/receive voice signals on a voice telephone line.

The operation panel part 16 is provided with an input part 20 (input part) and a display part 21 (display part).

The input part 20 includes a touch panel and a collection of buttons which are for acquiring various instructions from the user. The touch panel of the input part 20, which is resistance film type or electrostatic capacitance type, is configured to detect coordinates of the display part on which the user depresses or a pressing force when the user depresses the display part. If the touch panel is a multi-touch compatible one, plural coordinates and press forces may be detected. The button part of the input part 20 is a collection of buttons includes a start key, numeric keys, buttons that are configured to switch operation modes of copying and scanning, and buttons that are configured to acquire instructions associated with, for example, printing, transmitting, and receiving a selected document. If the input part 20 is formed as electrostatic capacitance type one, the input part 20 is capable of detecting a finger action or the like of a user even if he/she at a position spaced apart a specified distance from the input part 20.

The input part 20 is capable of acquiring a gesture instruction such as an instruction by user's finger moving.

The indication part 21 is, for example, a flat display panel, a projector, or a status indication LED which is made from, for example, an LCD (Liquid Crystal Display), or an OEL (Organic Electro-Luminescence). The display part 21 is configured to display various operation screens.

The display part 21 is configured to indicate an "Object" that is a unit group of various indication images including, for example, user perceivable icons or background images.

Figure 2:
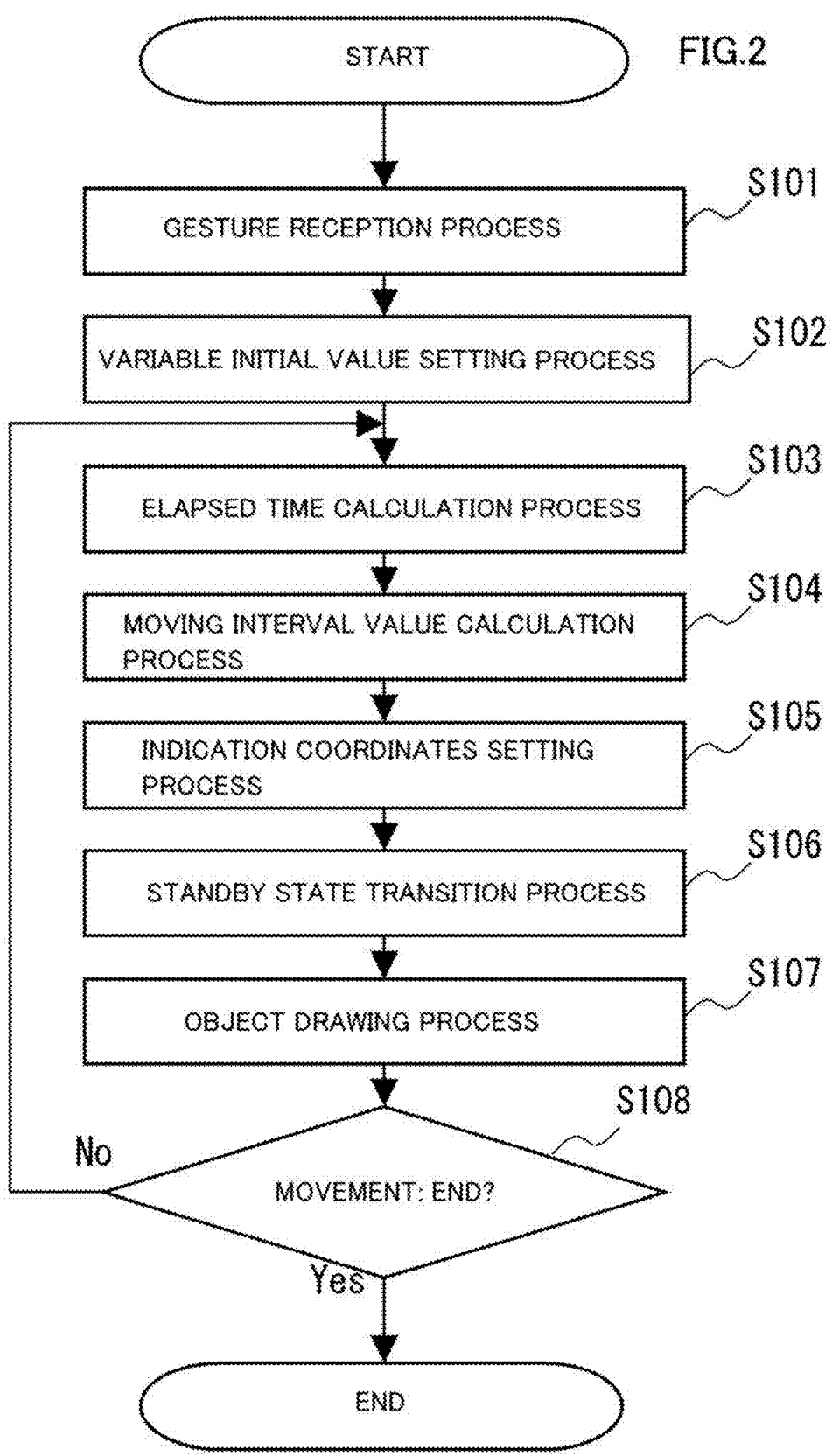
FIG. 2 is a flowchart of an object moving process according to an exemplary embodiment of the present invention.

The indication part 21 is also configured to have a capability of a "Preview" image of a scanned image stored in the storage part 19 (refer to FIG. 2).

The timer part 18 is configured to act as a time acquiring part for a CPU built-in clock, a real time clock, a GPS (Global Positioning System) receiver, an NTP client, and the like. The timer part 18 is capable of acquiring time information of actual time with less errors.

The time part 18 is also capable of providing a timer that causes the thread or the like to generate an exception or to receive a break after an elapse of the set time. The timer part 18 causes, when the elapse of the time that this timer has set, to change the thread or the like which is being under standby state to execute state.

The storage part 19 is a storage part which uses storage media including, for example, semiconductor memories such as a ROM (Read Only memory) and a RAM (Random Access memory) and/or a HDD (Hard Disk Drive).

The RAM of the storage part 19 has a self-refresh function of retaining the stored contents even being under power saving state.

In the ROM and HDD of the storage part 19, there is stored a control program for operation control of the image forming apparatus 1. In addition to this, the storage part 19 stores user account settings. Further, storage part 19 may include an area for saving holders of each user.

It is to be noted that in the image forming apparatus 1, the control part 10 and the image process part 11 may be formed in to an integrated configuration such as a CPU with a built-in GPU or the like or a chip-on-module package.

The control part 10 and the image forming part 11 may also include a built-in RAM, ROM, flash memory, or the like.

Further, the image forming apparatus 1 may be equipped with a FAX transmission/reception part for facsimile transmission/reception.

[Operation of Image Forming Apparatus 1]

Figure 6:
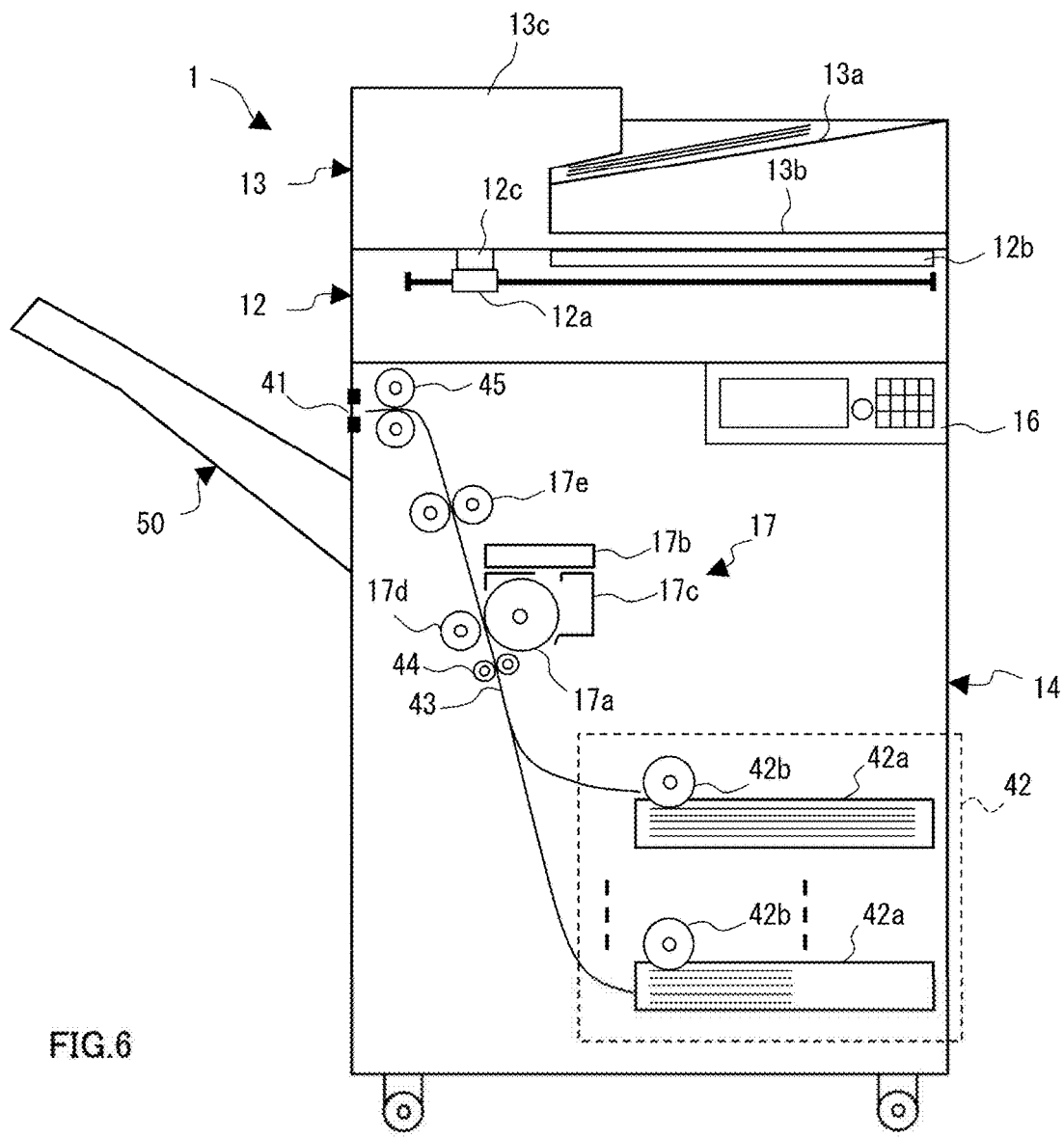
FIG. 6 is a schematic diagram of the information processing device shown in FIG. 1.
Figure 7A:
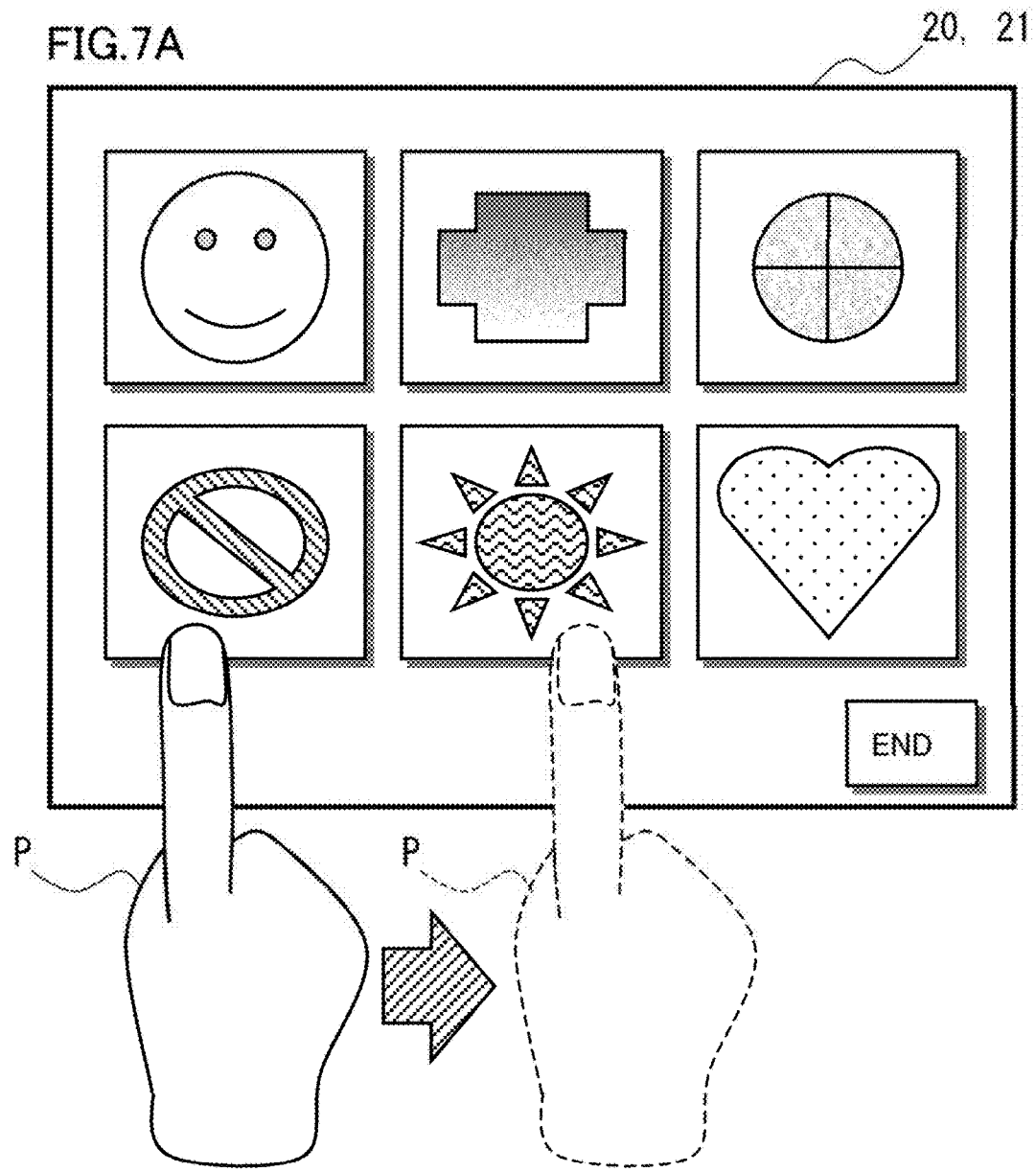
FIG. 7 is a conceptual diagram that is illustrative of a conventional gesture-based input.

Next, with reference to FIG. 6, a description is made as to an operation of the image forming apparatus 1 according to an exemplary embodiment of the present invention.

The document reading part 12 is provided on a main part 14 and the document feeding part 13 is mounted on the document reading part 12. The stack tray 50 is located at a side of a discharging exit 41 formed at the main part 14 and the operation panel part 16 is positioned at a front side of the image forming apparatus 1.

The document reading part 12 includes a scanner 12a, a platen glass 12b, and a document reading slit 12c. The scanner 12a is made up of, for example, an exposure lamp, and CCD (Charged Coupled Device) and CMOS (Complementary Metal Oxide Semiconductor) image capturing sensors, and is configured to be movable in a direction along which a document is made being conveyed by the document feeding part 13.

The platen glass 12b is a document table that is formed of a transparent material such as a glass. The document reading slit 12c has a slit that is formed to extend perpendicular to the direction along which the document is made being conveyed by the document feeding part 13.

If the scanner 12a reads a document that is mounted or placed on the platen glass 12b, the scanner 12a is moved to a position so as to be in opposition to the platen glass 12b and then reads the document mounted on the platen glass 12b while scanning the document for acquiring image data 31, outputting the acquiring image data 31, to the control part 10 (FIG. 5) provided in the main part 14.

In addition, if the scanner 12a reads a document that is being carried by the document feeding part 13, the scanner 12a is moved to a position opposed to the document reading slit 12c, and reads the document through the document reading slit 12c in synchronization with the document carrying operation of the document feeding part 13 for acquiring image data 310, outputting the acquired image data 310, to the control part 10 provided in the main part 14.

The document feeding part 13 includes a document mounting part 13a, a document discharge part 13b, and a document carrying mechanism 13c. The documents placed in the document mounting part 13a are so fed in a sequential one by one manner by the document carrying mechanism 13c as to be carried to a position that is in opposition to the document reading slit 12c, and thereafter are discharged into the document discharge part 13b.

It is to be noted that the document feeding part 13 that is configured to be tiltable and therefore bringing the document feeding part 13 upward makes it possible to expose of a top face of the platen glass 12b.

The main part 14 includes the image forming part 17 and also includes the paper feeding part 42, the paper carrying passage 43, the paired carrying rollers 44, and the paired discharging rollers 45. The paper feeding part 42 includes a plurality of paper feeding cassettes 42a that are configured to accommodate therein a plurality of recording sheets of different sizes and different orientation and feed rollers 42b of which is configured to feed out the papers in a sequential one by one manner from each of the paper feeding cassette 42a to the paper carrying passage 43. The feed rollers 42b, the paired carrying rollers 44, and the paired discharging rollers 45 cooperate to act as the convey part. The paper is to be carried by this convey part.

The recording paper fed out from the feed rollers 42b is conveyed, by the paired conveying rollers 44, to the image forming part 17. Then, the recording paper on which a recording is made by the image forming part 17 is discharged, by the paired discharging rollers 45 into the stack tray 50.

The image forming part 17 includes a photoconductive drum 17a, an exposure part 17b, a developing part 17c, a transfer part 17d, and a fixing part 17e. The exposure part 17b is an optical unit that includes a laser device, mirrors, lenses, LED array, and other equipment, and is configured to expose the photoconductive drum 17a by outputting light beams or the like based on image data 310 and form an electrostatic latent image on a surface of the photoconductive drum 17a. The develop part 17c, which is a developing unit for developing the electrostatic latent image formed on the photoconductive drum 17a using toner, is configured to form a toner image on the photoconductive drum 17a based on the electrostatic latent image. The transfer 17d is configured to the toner image onto the recording paper which is formed on the photoconductive drum 17a by the developing part 17c.

Figure 1:
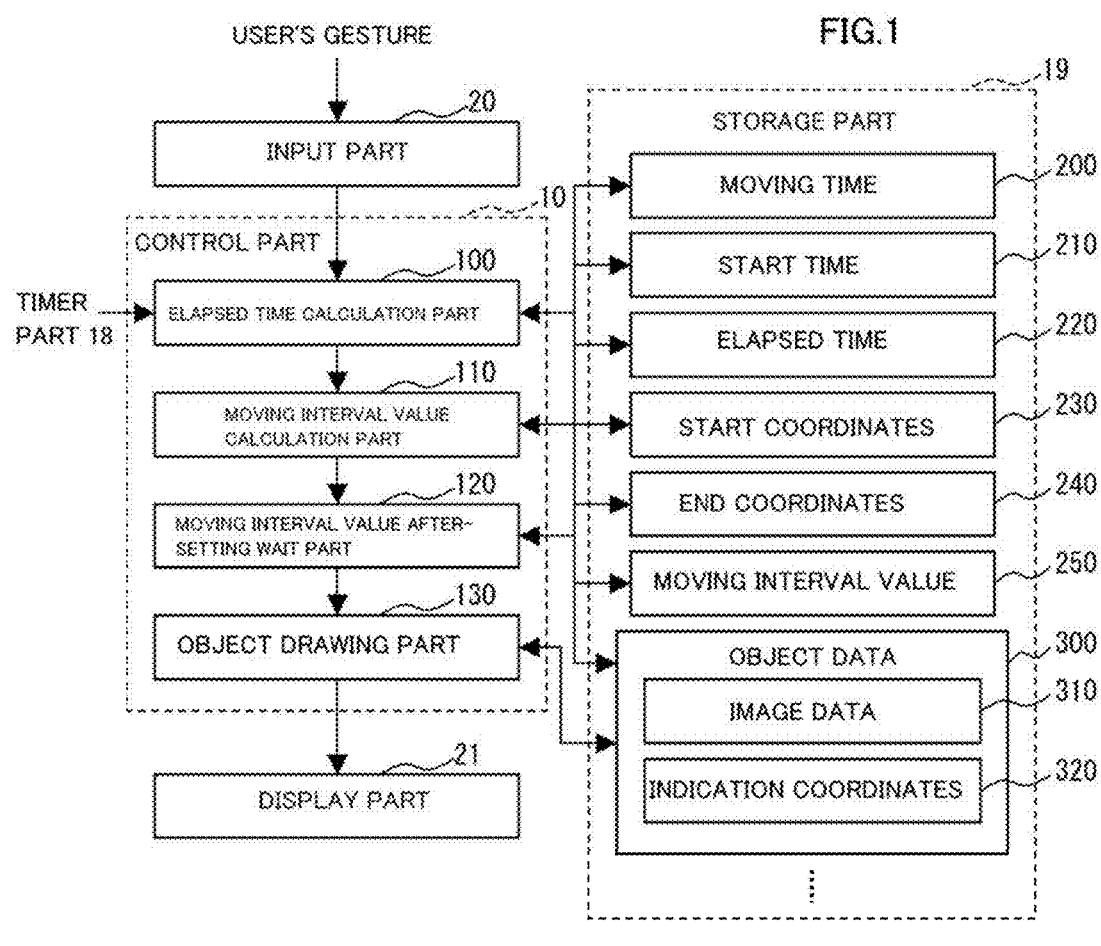
FIG. 1 is a system configuration diagram of an information processing device according to an exemplary embodiment of the present invention.

Next, with reference to FIG. 1, a description is made as to a system configuration of the image forming apparatus 1.

The control part 10 includes an elapsed time calculation part 100, a moving interval value calculation part 110, a moving interval value after-setting wait part 120 (moving interval value setting part), and an object drawing part 130.

The storage part 19 stores therein a moving time 200, a start time 210, an elapsed time 220, start coordinates 230, end coordinates 240, a moving interval value 250, and object data 300.

The elapsed time calculation part 100 is configured to calculates the elapsed time 220 from the object begins to move. The elapsed time calculation part 100 is configured to, when the elapsed time calculation part 100 detects a gesture through the input part 20 which indicates that the object begins to move, acquire a current time instant from the timer part 18 to set the start time 210 in the storage part 19. The elapsed time calculation part 100 is also configured to, when the elapsed time calculation part 100 detects the gesture through the input part 20, recognize the kind of the gesture, calculate the start coordinates 230, the end coordinates 240, and the moving time 200 to reserve in the storage part 19.

The elapsed time calculation part 100 is also configured to, whenever a transition is made from a standby state to an execution state, subtract the current time measured by the timer part 18 from the storage part 19, calculates the elapsed time 220, and stores the elapsed time 220 in the storage part 19.

The moving interval value calculation part 110 is configured to calculate the moving interval value 250 of an object indication coordinates 320 based on a ratio between the elapsed time 220 and the moving time 200 which are measured by the elapsed time calculation part 100 and a subtraction between the end coordinates 240 and the start coordinates 230.

The moving interval value calculation part 110 is configured to use a moving interval between the end coordinates 240 and the start coordinates 230 which are calculated from the detected gesture by the input part 20 for calculating the moving interval value 250 pursuant to the following formula (1).

$$\text{Moving Interval value 250} = \text{Elapsed Time 220} / \text{Moving time 200} \times \text{Moving Distance}$$

It is to be noted that the moving interval may be represented in vector format that includes vertical axis coordinate value and horizontal axis coordinate value. In this case, the moving interval value should be calculated for each of the vertical axis and the horizontal axis.

The moving interval value after-setting wait part 120 is configured to add the moving interval value 250 calculated by the moving interval value calculation part 110 to the object indication coordinates 320. Thereafter, the moving interval value after-setting wait part 120 brings a thread or the like which is changing the object indication coordinates 320 into a standby state such as a sleep (stop) state for a set waiting interval.

The object drawing part 130 is configured to, while the moving interval value after-setting wait part 120 hold the thread or the like in the standby state, draw an object on a coordinates on which the moving interval value 250 has been added and to cause the display part to display the object. At this stage, the object drawing part 130 is configured to clear, for example, a displaying buffer to be displayed on the display part 21 which is in the storage part 19 and to draw various image data 310 that includes therein image data 310 of the object data 300 whose indication coordinates has been moved according to the order of the display. The object drawing part 130 may also be configured to, after completion of the drawings, cause the timer part 18 to calculate a time required for drawing all the objects and to set a waiting time by adding a specified value to the resulting time.

It is to be noted that the object drawing part 130 may be implemented as a browser function that is designed to draw various objects using data of HTML and Java (Registered Trademark) Script or the like on OS.

The moving time 200 is calculated time based on the gesture detected through the input part 20. The moving time 200 is so set as a time interval which ranges from a start of an input of the gesture to an end of the input of the gesture by the elapsed time calculation part 100. Alternatively, as the moving time 200, specifying a value may be set that is required for scrolling or the like. In addition, as the moving time 200, it may be possible to prepare a table only for each device in order to specify a value that allows for reducing the burden of the control part 10.

The start time 210 is a value of the current time instant at which the object begins to move after the input part 20 detects the gesture.

The elapsed time 220 is a value of the elapsed time from the start time 210. The elapsed time 220 is set whenever the object is moved in a stepwise manner after transition from the standby state to the executing state.

The waiting time is a waiting time interval that is measured from when the moving interval value after-setting wait part 120 sets the indication coordinates of the object data 300. Alternatively, as the waiting time, a time interval required for drawing all the objects by processing the browser or the like of the object drawing part 130. In addition, as the waiting time, a summation value, which is to be established when the moving interval value after-setting wait part 120 causes the thread or the like to be in the standby state, is available that is obtained by adding a specified value to the time required for carrying out the drawing process in which the object drawing part 130 draws all the objects. As this specified value, for example, setting the order of tens of milliseconds is available for reducing the burden of the control part 10.

It is to be noted that as the waiting time a constant value may be set that is indicative of the minimum drawing interval, the constant ranging, for example, from 0 to a few of microseconds. In this case, the thread or the like is transitioned from the standby state to the executing state immediately when the object drawing part 130 completes the drawing.

The start coordinates 230 is a coordinates, when calculated at the detection of the gesture through the input part 20, which is indicative of a start point of the object from which the object begins to move. As the start coordinates 230, for example, it may be possible to employ a coordinates of an upper left point of the object to be moved.

The end coordinates 240 is a coordinates, when calculated at the detection of the gesture through the input part 20, which is indicative of an end point of the movement of the object. As the end coordinates 240, for example, it may be possible to employ a coordinates of an upper left point of the object at the time when the movement of the object ends.

The moving interval value 250 is a value that is to be added to the indication coordinates 320 of the object data 300 in a stepwise manner during the movement of the object. The moving interval value 250 is calculated by the moving interval value calculation part 110.

The object data 300 is each data of the object which is displayed on the display part 21.

The object data 300 includes the image data 310 and the indication coordinates.

The image data 310 is data of each an image displayed on the indication part 21 by the browser or the like and an icon associated with each an instruction or the like and a pre-view image or the like may be set.

The indication coordinates 320 is data of coordinates on which the image data 310 is displayed. The indication coordinates 320 are configured to be added with the moving interval values 250 in a stepwise manner as the object moves.

It is to be noted that using the screen coordinates on the indication part 21 is preferable as the start coordinates 230, the end coordinates 240, and the indication coordinates. In addition, it may be possible to use coordinate systems that include, for example, a coordinate system with the decimal point of 0 to 1 along each of vertical and horizontal directions, a coordinate system in three-dimensional space, a translate coordinate system, or a polar coordinate system or the like.

Further, as the object data 300, for example, an ID (Identification) or a function may be designated which is to be called at an event time. Moreover, the object data 300 may include grouping or inheritance information, or setting of, for example, or a constructor or a destructor.

Here, the control part 10 of the image processing part 1 acts as, by executing a control program stored in the storage part 19, the elapsed time calculation part 100, the moving interval value calculation part 110, the moving interval value after-setting wait part 120, and the object drawing part 130. Furthermore, each part of the foregoing image forming apparatus 1 make up a hardware resource that is configured to implement the image forming method according to the present invention.

[Object Moving Process by Image Forming Apparatus 1]

Next, with reference to FIG. 2 to FIGS. 4A and 4B, a description is made as to an object moving process that is implemented by the image forming apparatus 1 according to an exemplary embodiment of the present invention.

In the object drawing process of the present exemplary embodiment, the display part is caused to display the object of the indication coordinates 320 that undergoes a change from the start coordinates 230 to the end coordinates 240 within the specified time interval 200 in a stepwise manner. In this case, the moving interval value 250 which is for causing the coordinates of the object to change in a stepwise manner is calculated based on a ratio between the elapsed time 220 and the moving time 200 and a subtraction between the end coordinates 240 and the start coordinates 230.

The object moving process according to the present exemplary embodiment is implemented, using the hardware resource, by an execution of the program stored in the storage part 19 by the control part 10 that collaborates with each other part.

Hereinbelow, with reference to a flowchart shown in FIG. 2, the object moving process is detailed for each step.

(Step S101)

First of all, the control part 10, as the elapsed time calculation part 100, executes a gesture reception detection process.

The control part 10 receives a gesture-based instruction from the user through for example, a touch panel of the input part 20. For example, if the user makes a contact with the touch panel with his/her finger and then performs a swipe action while keeping the finger in contact with the touch panel, the control part 10 receives such a swipe action as a gesture.

(Step S102)

Then, the control part 10, as the elapsed time calculation part 100, executes a variable initial value setting process.

As to the swipe action, the control part 10 calculates a vertical axis vector and a horizontal axis vector based on a coordinates on which a finger contact is detected and a coordinates from which a finger release is detected in order to find a moving interval based on the detected vectors. The control part 10 calculates the moving interval in each of a vertical axial direction and/or a horizontal axial direction if the gesture-based operation is conducted in the form of vertical and/or horizontal scroll operations. The control part 10 sets the start coordinates 230 by employing the current indication coordinates of the object data 300 and stores the start coordinates 230 in the storage part 19. The control part 10 also adds the foregoing vectors to the preceding indication coordinates to set the end coordinates 240 and stores the same in the storage part 19.

As to the swipe action, the control part 10 also calculates a time interval, as the moving time 200, which ranges from the time of the finger contact to the time of the finger release and stores the moving time 200 in the storage part 19. In addition, the control part 10 acquires the current time from the timer part 18 and stores the same as the start time 210 in the storage part 19. Further, the control part 10 sets the elapsed time 220 to "0" and stores the elapsed time 220 in the storage part 19.

Figure 3A:
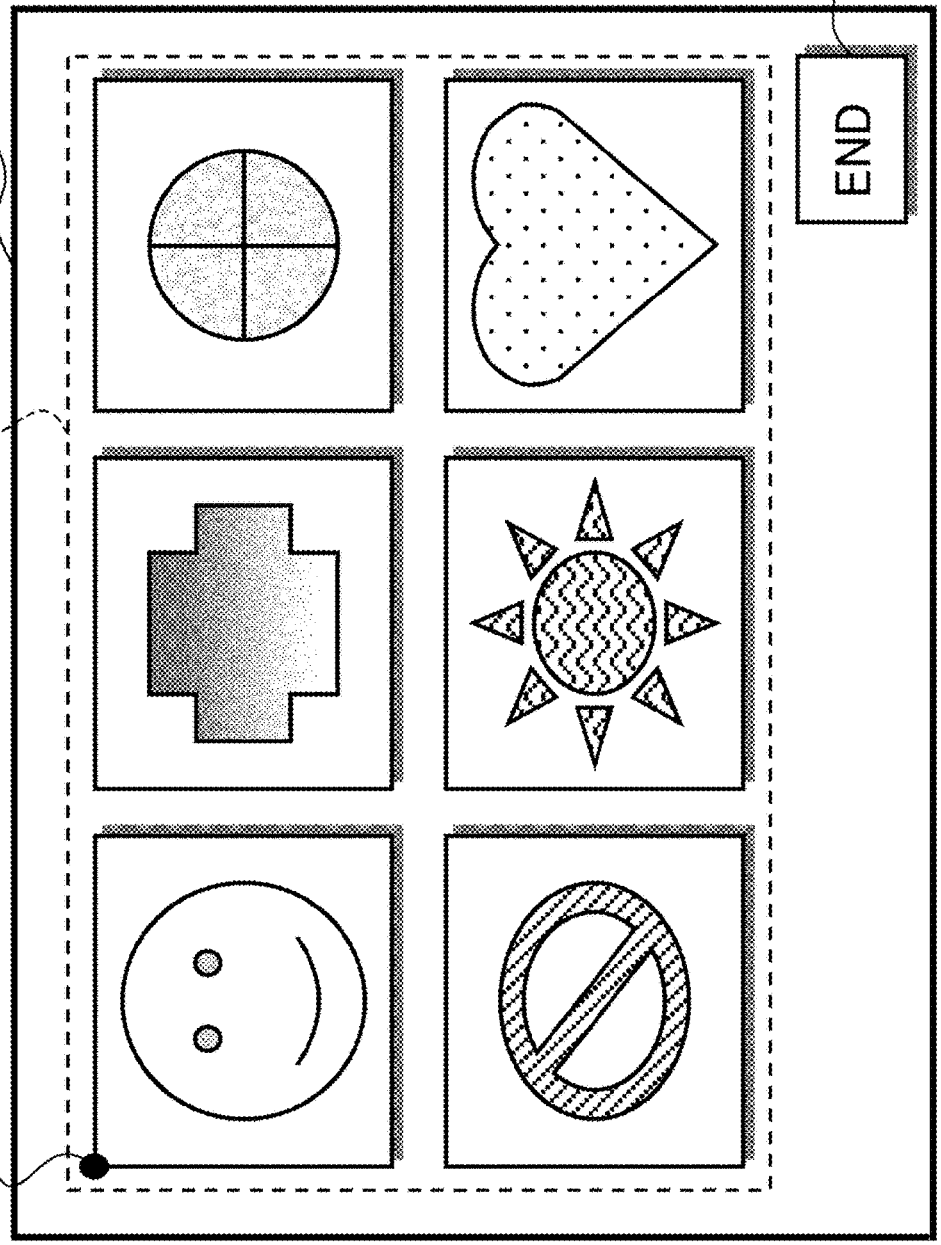
FIG. 3A is a conceptual diagram of a moving interval value calculation process shown in FIG. 2.

With reference to FIGS. 3A, 3B and 3C, in a screen example 501 as depicted in FIG. 3A, a point P1 at the upper left of an object group 600 as a group of the object data 300 is the start coordinates 230. In addition, a screen example 502 as depicted in FIG. 3B is indicative of the movement of indication coordinates of the object group 600, as an interim progress, which is under a stepwise change. A point P3 at the upper left of the object group whose state is after movement as depicted in a screen example 503 in FIG. 3C is the end coordinates 240. Further, in the screen example 503, a subtraction of the point P3 from the point P1 is equal to the moving interval in magnitude.

It is to be noted that the control part 10 may allow for depicting an object, a background image, and so, such as a button 700 shown in FIGS. 3A, 3B and 3C, which are not moved by the gesture.

(Step S103)

At this stage, the control part 10, as the elapsed time calculation part 100, executes an elapse time calculation process.

The control part 10 causes the thread for drawing the object data 300 or the like to return to the execution state if the thread is in the standby state.

The control part 10 acquires the current time from the timer part 18 and calculates the elapsed time 220 by subtracting the start time 210 from the current time. This elapsed time 220 is a time elapse measured from the time when the object starts the movement.

The control part 10 causes the storage part 19 to store therein the calculated elapsed time 220.

(Step S104)

Then, the control part 10, as the moving interval value calculation part 110, executes a moving interval value calculate operation.

The control part 10 divides the elapsed time 220 by the moving time 200 to find a ratio value. Based on this, the control part 10 calculates a value of the moving interval, as the moving interval value 250, by multiplying the ratio value with the moving interval. The image control part 10 causes the storage part 19 to store therein the calculated moving interval value 250.

(Step S105)

Then, the control part 10, as the moving interval value after-setting wait part 120, executes an indication coordinates setting procedure.

The control part 10 sets a value that is addition of the moving interval to the indication coordinates of the object data 300.

The screen example 502 in FIG. 3B indicates a point P2, under movement, to which the moving interval value 250 has been added.

(Step S106)

Then, the control part 10, as the moving interval value after-setting wait part 120, executes a standby state transition process.

The control part 10 brings the thread or the like into the standby state such as the sleep state.

(Step S107)

Then, the control part 10, as the object drawing part 130, executes an object drawing process.

The control part 10 causes the display part 21 to display the image data 310, as to each the object data 300, on which the indication coordinates is reflected by the browser or the like.

(Step S108)

Then, the control part 10, as the object drawing part 130, determines whether or not the movement of the object completes. If the movement of the object completes, the control part 10 provides a "YES" determination and the control part 10 otherwise provides a "NO" determination.

If the determination is "YES", the control part 10 terminates the object moving process.

If the determination is "NO", the control part 10 causes the program to return to STEP S103 to continue the movement of the object until a return of the execution state from the standby state.

By way of the foregoing Steps, the object moving process according to the exemplary embodiment of the present invention terminates.

With the foregoing configuration, it is possible to provide the following effects.

Until now, when a new model is developed, it is compelled to rewrite a table in which drawing time intervals of fixed values are arranged.

To the contrary, the image forming apparatus 1 according to the exemplary embodiment of the present invention is an information processing device that is configured to cause a display part 21 to display image data 310 of the object data 300 while changing the indication coordinates 320 of the object data 300 from start coordinates 230 to end coordinates 240 in a stepwise manner within a moving time 200, the information processing device having a feature to include the elapsed time calculation part 100 that is configured to calculate an elapsed time 220 from a start of the movement of the object, the moving interval value calculation part 110 that is configured to calculate moving interval values 250 of indication coordinates 320 of the object based on a ratio of the elapsed time 220 calculated by the elapsed time calculation part 100 to the moving time 200 and differences between the end coordinates 240 and the start coordinates 230, the moving interval value after-setting wait part 120 that is configured to add the moving interval values 250 calculated by the moving interval value calculation part to the indication coordinates 320 of the object for establishing a standby state for a standby time duration, and the object drawing part 130 that is configured to draw the object on coordinates to which the moving interval values 250 are add and causes the display part to display the object while the standby state established by the moving interval value after-setting wait part 120.

With such the configuration, it is possible to calculate the moving interval value 250 as the image drawing position in a dynamic fashion based on a scroll completion scheduled time and the current time. For this reason, at all, preparing a table is unnecessary in which drawing time intervals of fixed values are arranged. In addition, without having to modify the program, a new model is capable of performing the similar operations. Thus, it is possible to reduce the developing cost.

In addition, in the conventional scroll processing, even though the drawing processing ends earlier than scheduled, the drawing of regular intervals causes the control part to occur a useless waiting time.

To the contrary, the image forming apparatus 1 of the present exemplary embodiment calculates the indication coordinates 320 for drawing object based on the moving time 200 when a previously designated drawing is scheduled to end. For this reason, even if the number of drawings and/or timing of the drawing change, at a scheduled moving time 200, it is possible to calculate the coordinates of the end position at which the movement stops. In addition, the time when the movement of the object terminates is made constant regardless of the state of the control part 10, which makes it possible to derive effectively the control arithmetic capability.

Further, conventionally, it was possible to identify the hardware performance but was not possible to detect at all which kind of process is in execution in the background. For this reason, in the conventional scrolling process, setting the drawing interval to be shorter robs of the control arithmetic resource of the control part which is used in the background process, which may cause the user operability to degrade.

To the contrary, in the present exemplary embodiment, even the background process is execution, the dynamic calculation of the moving interval value 250 makes it possible to ensure the number of movements and the interval adequately. For this reason, it is possible to stabilize the time interval which the movement of the object completes, thereby enhancing the user operability.

In addition, the image forming apparatus 1 according to an embodiment of the present invention includes an input part that is configured to acquire a user's gesture instruction, the object is various instruction image data displayed on a browser, the various instruction image data being scrolled for display by treating coordinates of a current position of the various instruction image data as the start coordinates 230, treating coordinates of a position which is pointed by the gesture acquired by the input part as the end coordinates 240, treating a time interval which ranges from an initiation of the gesture to a termination of the gesture as the moving time 200.

With such a configuration, using the coordinates instructed by the user's gesture such as a swipe action makes it possible to causes the object to move in scroll mode depending on the processing ability of the control part 10. Thereby, even though the browser or the like is used which is executed by the control part 10 of the information processing device which is of lower ability in processing or drawing, it is possible to achieve a scroll drawing with high for the user with enhanced operability.

With reference to FIGS. 4A and 4B, as to the aforementioned effects, a comparison description is made between the conventional scroll process and the object drawing process of the present exemplary embodiment.

FIG. 4A illustrates an example of the conventional scroll process in which a scroll time is set to be 500 microseconds, the drawing interval time is set to be 50 microseconds, the moving interval of the fixed value is set to be 50 px (pixels), and the number of drawings is set to be 10. In this example, the image or the like is caused to scroll by 500 px for 500 microseconds.

The reference code (i) is an example in which adequate drawing intervals are illustrated. The open square indicates the foregoing steps S204 to S206, while the black stripe indicates of the processing time of the foregoing STEP S207. Thus, adequate designation of the drawing interval time brings the drawings at an adequate interval.

The reference code (ii) is illustrative of an example of a shortened drawing time in the image drawing process due to the efficiency of the firmware or the like in the same model device. Even in such a case, similar to (i), the drawing is made ten times. However, the drawing interval becomes longer which corresponds to the scroll time, causing a useless waiting time to occur.

The reference code (iii) indicates an example of a lengthened drawing time which is caused by an occurrence of a background process. In this case, the drawing process fails to terminate within the scheduled drawing interval time and therefore the scroll termination time delays. Sometimes, there was a problem that the actual time required for the drawing may be lengthened and irregular due to the state of the control part. However, lengthening the drawing time in light of such a background process causes the number of the drawings per unit time is decreased and thus raises a problem in which the scroll is seen to flicker.

FIG. 4B is illustrative of an example of the object drawing process according to the present exemplary embodiment.

The reference codes (iv) to (vi) are examples of the adequately calculated moving interval value 250 depending on loads of their drawing process in the object drawing process according to the present exemplary embodiment In the present exemplary embodiment, even though the number and/or timing of the drawings, on the scheduled time, the coordinates of the scroll termination position are calculated. For this reason, in the present exemplary embodiment, it is possible to utilize the control part 10 in an effective manner regardless of the state of the control part 10, the time required for the drawing, making the drawings as many as possible in a smooth manner. In addition, no delay occurs for terminating the drawing process. Further, it is possible to calculate an adequate drawing interval time on different hardware and without having to stop the background process. Moreover, it is possible to make drawings suitable for the device spec.

It is to be noted that in the present exemplary embodiment, the description is made to that the moving interval value 250 is calculated every time.

However, a process may be available in which a calculation of the moving interval value 250 is made by calculating a required time for making a drawing after the drawing completes one time and thereafter the interval timer is set for being added to the calculated moving interval value 250.

With such a configuration, calculating a ratio or the like can be unnecessary, reducing the process load.

In addition, in the description of the present exemplary embodiment as an example is employed wherein the drawing process is made once the standby state has been established on the browsers of different performance. However, it may be possible to employ a drawing by a vertical synchronization or the like regardless of the drawing interval of the browser.

Further, in the description of the present exemplary embodiment, as an example of the object to be moved, various instruction image data or the like is employed. However, the object to be moved may include on-screen dragged object, background image, or the like. In such a case, it may be possible to differentiate the various instruction image data or the like and the background image or the like in moving interval value 250 to be set, in order to make a so-called "double scrolling" drawing.

Moreover, instead of moving the screen coordinates on the display part 21, a drawing is available which is made such that XY coordinates in 3D space are transited and projected on 2D space after being performed with affine transformation or the like.

Still more, the present invention is applicable to information processing devices other than an image forming apparatus. More specifically, the information processing devices may include a configuration using a server or similar equipment that is connected additionally, via an USB or the like, with a network scanner and/or a scanner.

Still furthermore, the exemplary embodiment of the present invention is described by way of the process that the image forming apparatus 1 as an example. However, the object moving process of the present exemplary embodiment may be also available to OS application software programs that include, for example, WWW browser and Windows (Registered Trademark) that run on PCs or Smart Phones.

It should be understood that the configuration and operation of the aforementioned exemplary embodiment are mere examples and therefore may be suitably modified and carried out without departing from the spirit and scope of the present invention.

EXPLANATION OF REFERENCE CODES

1 Image Forming Apparatus
10 Control Part
11 Image Processing Part
12 Document Reading Part
12a Scanner
12b Platen Glass
12c Document Reading Slit
13 Document Feeding Part
13a Document Mount Part
13b Document Discharging Part
13c Document Convey Mechanism
14 Main Body Part
15 Network Transmission/Reception Part
16 Operation Panel Part
17 Image Forming Part
17a Photoconductive Drum
17b Exposure Part
17c Develop Part
17d Transfer Part
17e Fixing Part
18 Timer Part
19 Storage Part
20 Input Part
21 Display Part
41 Discharging Exit
42 Paper Feeding Part
42a Paper Feeding Cassette
42b Paper feeding Roller
43 Paper Carrying Passage
44 Paired Conveying Rollers
45 Paired Discharging Rollers
50 Stack Tray
100 Elapsed Time Calculation Part
110 Moving Interval Value Calculation Part
120 Moving Interval Value After-setting Wait Part
130 Object Drawing Part
200 Moving Time
210 Start Time
220 Elapsed Time
230 Start Coordinates
240 End Coordinates
250 Moving Interval Value
300 Object Data
310 Image Data
320 Indication Coordinates
501,502,503 Screen Example
600 Object Group
700 Button
P1, P2, P3 Point

The invention claimed is:

1. An information processing device that is configured to cause a display part to display indication coordinates of an object while the indication coordinates of the object are caused to transit for movement from start coordinates to end coordinates within a specified moving time in a stepwise manner, the information processing device comprising:
   an elapsed time calculation part that is configured to calculate an elapsed time from a start of the movement of the object;
   a moving interval value calculation part that is configured to calculate moving interval values of the indication coordinates of the object based on a ratio of the elapsed time calculated by the elapsed time calculation part to the moving time and differences between the end coordinates and the start coordinates;
   a moving interval value setting part that is configured to add the moving interval values which are calculated by the moving interval value calculation part to the indication coordinates of the object; and
   an object drawing part that is configured to draw the object on coordinates which the moving interval value setting part adds the moving interval values to the indication coordinates of the object and cause the display part to display the drawn object;
   wherein
   the moving interval value calculation part is configured to calculate, after the object drawing part performs said drawing of the object a first time, a movement interval value by calculating a time required for the drawing;
   the information processing device is configured to set up, after the moving interval value calculation part calculates the movement interval value, an interval timer;
   the moving interval value is configured to add, after the interval timer is calculated, the interval timer to the calculated movement interval value, thereby increasing the movement interval value by the interval timer;
   the object drawing part uses said increased movement interval value for a subsequent drawing;
   the movement interval value is independently set for different objects selected from a plurality of instruction image data, an on-screen dragged object, and a background image;
   the information processing device comprises an input part configured to acquire a user's gesture instruction; and
   current position coordinates of the plurality of present instruction images are used as start coordinates, coordinates of a terminal point of movement calculated when the gesture acquired by the input part is acquired are used as end coordinates, time from start to end of the input of the gesture is used as the moving time, and the plurality of instruction images and the background image are scrolled to display on a display part.

2. An information processing device that is configured to cause a display part of an operation panel to display indication coordinates of an object while the indication coordinates of the object are caused to transit for movement from start coordinates to end coordinates within a specified moving time in a stepwise manner, the information processing device comprising:
   an elapsed time calculation part that is configured to calculate an elapsed time from a start of the movement of the object;
   a moving interval value calculation part that is configured to calculate moving interval values of the indication coordinates of the object based on a ratio of the elapsed time calculated by the elapsed time calculation part to the moving time and differences between the end coordinates and the start coordinates;
   a moving interval value setting part that is configured to add the moving interval values which are calculated by the moving interval value calculation part to the indication coordinates of the object; and an object drawing part that is configured to draw the object on coordinates which the moving interval value setting part adds the moving interval values to the indication coordinates of the object and cause the display part to display the drawn object;

wherein the moving interval value calculation part is configured to calculate, after the object drawing part performs said drawing of the object a first time, a movement interval value by calculating a time required for the drawing;

the information processing device is configured to set up, after the moving interval value calculation part calculates the movement interval value, an interval timer;

the moving interval value is configured to add, after the interval timer is calculated, the interval timer to the calculated movement interval value, thereby increasing the movement interval value by the interval timer;

the object drawing part uses said increased movement interval value for a subsequent drawing;

the movement interval value is independently set for different objects selected from a plurality of instruction image data, an on-screen dragged object, and a background image;

the information processing device comprises an input part configured to acquire a user's gesture instruction; and current position coordinates of the plurality of present instruction images are used as start coordinates, coordinates of a terminal point of movement calculated when the gesture acquired by the input part is acquired are used as end coordinates, time from start to end of the input of the gesture is used as the moving time, and the plurality of instruction images and the background image are scrolled to display on a display part.

3. An information processing method that is to be implemented by an information processing device that is configured to cause a display part to display indication coordinates of an object while the indication coordinates of the object are caused to transit for movement from start coordinates to end coordinates within a specified moving time in a stepwise manner, the information method comprising the steps of:

calculating an elapsed time from a start of the movement of the object;

calculating moving interval values of the indication coordinates of the object based on a ratio of the elapsed time that is calculated to the moving time and differences between the end coordinates and the start coordinates;

adding the calculated moving interval values to the indication coordinates of the object;

displaying the object on the display part after drawing the object on coordinates as an addition of the moving interval values to the indication coordinates of the object;

calculating, after said performing the drawing of the object a first time, a movement interval value by calculating a time required for the drawing;

setting up, after said calculating the movement interval value, an interval timer;

adding, after the interval timer is calculated, the interval timer to the calculated movement interval value, thereby increasing the movement interval value by the interval timer; and using said increased movement interval value for a subsequent drawing;

wherein the movement interval value is independently set for different objects selected from a plurality of instruction image data, an on-screen dragged object, and a background image;

the information processing device comprises an input part configured to acquire a user's gesture instruction; and current position coordinates of the plurality of present instruction images are used as start coordinates, coordinates of a terminal point of movement calculated when the gesture acquired by the input part is acquired are used as end coordinates, time from start to end of the input of the gesture is used as the moving time, and the plurality of instruction images and the background image are scrolled to display on a display part.

* * * * *